US006941177B2

(12) United States Patent
Jackson et al.

(10) Patent No.: US 6,941,177 B2
(45) Date of Patent: Sep. 6, 2005

(54) SYSTEM AND METHOD FOR IMPLEMENTING REAL-TIME APPLICATIONS BASED ON STOCHASTIC COMPUTE TIME ALGORITHMS

(75) Inventors: Warren B. Jackson, San Francisco, CA (US); Markus P. J. Fromherz, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 198 days.

(21) Appl. No.: 10/320,938

(22) Filed: Dec. 17, 2002

(65) Prior Publication Data

US 2004/0117042 A1 Jun. 17, 2004

(51) Int. Cl.[7] ............................................. G05B 13/02
(52) U.S. Cl. ......................... 700/33; 700/31; 700/37; 700/45; 702/181; 706/19; 706/21
(58) Field of Search ........................... 700/28, 29, 31, 700/33, 37, 41, 44, 45; 702/181, 189; 706/19, 21; 713/322, 324; 318/254, 138

(56) References Cited

U.S. PATENT DOCUMENTS

| | | | | |
|---|---|---|---|---|
| 4,578,747 A | * | 3/1986 | Hideg et al. ................... | 700/31 |
| 5,307,444 A | * | 4/1994 | Tsuboka ........................ | 706/20 |
| 5,394,322 A | * | 2/1995 | Hansen ......................... | 700/37 |
| 5,640,491 A | * | 6/1997 | Bhat et al. .................... | 706/25 |
| 5,870,731 A | | 2/1999 | Trif et al. ..................... | 706/52 |
| 6,088,690 A | | 7/2000 | Gounares et al. ............. | 706/13 |
| 6,144,953 A | | 11/2000 | Sorrells et al. ................ | 706/60 |
| 6,278,899 B1 | * | 8/2001 | Piche et al. ................... | 700/44 |
| 6,445,963 B1 | * | 9/2002 | Blevins et al. ................ | 700/44 |
| 6,560,503 B1 | * | 5/2003 | Toprac et al. ............... | 700/108 |
| 6,567,718 B1 | * | 5/2003 | Campbell et al. ........... | 700/121 |
| 6,662,058 B1 | * | 12/2003 | Sanchez ....................... | 700/44 |
| 6,666,410 B2 | * | 12/2003 | Boelitz et al. ............... | 244/172 |
| 6,839,599 B2 | * | 1/2005 | Martin et al. ................. | 700/79 |
| 2002/0072828 A1 | * | 6/2002 | Turner et al. | |
| 2004/0040001 A1 | * | 2/2004 | Miller et al. | |
| 2004/0123600 A1 | * | 7/2004 | Brunell et al. | |

OTHER PUBLICATIONS

C. S. Chang et al., "An Approximate Method for Solving Optimal Control Problems", IEEE Transactions on Automatic Control, vol. 9, Issue 4, Oct. 1964, pp. 554–556.*

Raisch, J. and Francis, B. A.: Modeling deterministic uncertainty. In: The Control Handbook (Levine, W. S. (Ed.)), pp. 551–560, CRC Press, Boca Raton, 1996.

S. D. Patek and M. Athans, "MIMO Frequency Response Analysis and the Singular Value Decomposition", Chapter 29 pp. 507–518 in *The Control Handbook*, CRC Press, Boca Raton, FL, 1996.

"Analysis of Feedback systems with Structured Uncertainties" Proc. IEE, vol. 129, 6, pp. 242–250. Doyle, J. C., J. E. Wall and G. Stein (1982).

* cited by examiner

*Primary Examiner*—Anthony Knight
*Assistant Examiner*—Crystal J Barnes
(74) *Attorney, Agent, or Firm*—Linda M. Robb (57) ABSTRACT

A method for developing and using real time applications for a dynamic system having a sensing subsystem, actuation subsystem, a control subsystem, and an application subsystem utilizes stochastic compute time algorithms. After optimization functions, desired state and constraints are received and detector data has been provided from a sensor subsystem, a statistical optimization error description is generated. From this statistical optimization error description a strategy is developed, including the optimization errors, within the control subsystem. An execution module within the control subsystem then sends an execution strategy to various actuators within the actuation subsystem.

13 Claims, 5 Drawing Sheets

SYSTEM AND METHOD FOR IMPLEMENTING REAL-TIME APPLICATIONS BASED ON STOCHASTIC COMPUTE TIME ALGORITHMS

INCORPORATION BY REFERENCE

The following U.S. patents are fully incorporated herein by reference: U.S. Pat. No. 5,870,731 to Trif et al. ("Adaptive Problem Solving Method and System"); U.S. Pat. No. 6,088,690 to Gounares et al. ("Method and Apparatus for Adaptively Solving Sequential Problems in a Target System Utilizing Evolutionary Computation Techniques"); and U.S. Pat. No. 6,144,953 to Sorrells et al. ("Time-Constrained Inference Strategy for Real-Time Expert Systems").

BACKGROUND OF THE INVENTION

This invention relates generally to the field of computerized problem solving and in particular to a system and method for utilizing stochastic compute time algorithms for developing various real-time applications.

In certain embedded system applications, such as, for example, planning, scheduling, control, monitoring, and diagnosis applications, there exists a significant need for systems which can provide satisfactory decisions in critically time-constrained situations for complex systems having subsystems consisting of many networked sensors and actuators, with each subsystem having control, monitoring and fault diagnosis capabilities. Advances in hardware technology, such as inexpensive processors, low-cost microelectromechanical systems (MEMS) actuators and sensors, and decreasing communication costs, result in systems with unprecedented reconfigurability, flexibility, and robustness. However, networked embedded applications require decision system technology that combines distributed constrained optimization methods with complexity analysis and learning techniques.

Decision systems for such applications have not kept pace with hardware development. Traditionally, decision systems have utilized special-purpose computer programs dedicated to a single task. In various more recent decision systems have utilized model-based computer programs using generic constraint solving (finding a solution to a constraint problem) techniques executed on a single, high-end processor. For example, a simple constraint problem is "determining a roller velocity (desired solution) such that a sheet in a printing system arrives at the next registration station at the desired time (the objective) and the velocity does not exceed the roller's velocity limit (constraint)." An example of distributed embedded software is control software, such as software that controls a machine's functions and runs on multiple networked processors within a machine, instead of a single PC or workstation. Embedded applications, such as machine control, usually deal with complex constraint problems that have to be solved within tight real-time constraints, while embedded processors usually have strong resource limitations, such as a slow central processing unit with limited memory.

Constrained optimization is at the core of many embedded applications. In applications such as planning, scheduling, control, and diagnosis, it is necessary to generate timely and accurate solutions such as operational plans, control inputs, fault hypotheses, and recovery actions. The common task in these applications is to repeatedly find a solution for a given objective, a solution that is achievable within or consistent with the system's constraints. Today, such applications are typically hand-coded programs based on an extensive analysis of a fixed configuration and task of the system. However, in order to provide dynamic reconfiguration and fault-tolerant behavior for future networked embedded systems, as is often required in commercial and military applications, many synthesis operations must become part of the software's real-time operations. Although the invention described herein is not limited to military applications, the following discussion will pertain to a military situation for purposes of example only.

For example, military hardware often outlasts the usefulness of its technology. To address this issue, it is desirable to upgrade and re-purpose existing systems for new tasks instead of investing in new hardware. An unmanned underwater vehicle, for example, is potentially a multi-purpose undersea platform for weapons deployment, reconnaissance missions, mine sweeping, rescue operations, etc. However, upgrading or re-purposing such a vessel with new types of subsystems (weapons, sensors, mine-clearing or rescue equipment) is difficult, as the software has to coordinate and control interactions that are strongly dependent on the type, role, and original configuration of the equipment. Detecting and catching a mine, for example, requires taking into account the constraints of sensors, robotic arms, and propulsion, and the resulting constraint problems can be complex. The constraint problem to be solved repeatedly by the robot controller, for instance, may involve hundreds of nonlinear range, torque, and collision constraints for a modular manipulator, with multiple objectives such as reaching the target while conserving energy and minimizing motor noise. Today, such problems cannot be solved in real-time by existing techniques on embedded processors.

The second example is coordination of a large number of distributed embedded subsystems. For instance, the increasing number of hydrophonic sensors (on the order of 30,000 in a missile launcher-class submarine) used by sonars like Flank Arrays involves complex parallel architectures. Dynamically mapping and optimally reconfiguring huge data arrays, intensive workload, and data flows are known to be highly compute-intensive problems. Solutions must fit spatial constraints like processing units, memory organization and size, communication bandwidth, and data/computation locality, as well as temporal properties such as response times and latencies.

A final example is the distributed, fault-tolerant coordination of multiple vehicles. There are many applications that require the use of on-board solving services, from mission planning to optimal vehicle control. For instance, consider a set of aircraft formations autonomously performing a long-term mission behind the forward-edge battle area. Each formation leader performs the tactical (long-range) commanding of the formation, satisfying interoperability and coordination constraints, while all aircraft perform short-term self-control. Today, tasks such as planning, scheduling, and coordination are essentially performed before the mission. They consist of the generation of position-time trajectories according to mission objectives, specific navigation points, hostile and tactical environment constraints, and data correlation requirements. By solving these tasks dynamically and reactively to environment changes and mission updates, again using model-based techniques, the formation's availability and flexibility could be increased dramatically. This requires that the solvers distributed among the vehicles have the capability to adapt to a variety of objectives (mission goal, rules of engagement, detection avoidance, aircraft interaction, etc.), and that they are able to reconfigure themselves if individual aircraft exhibit reduced capabilities or even are disabled under enemy fire.

Applications running on networked embedded systems present constraint solvers with complex constraint problems that cannot be anticipated off-line. At the same time, constraint solvers must execute within stringent resource limitations in an inherently distributed computing environment. However, constraint solvers are usually not able to guarantee real-time performance and bounded memory use when used for complex systems. Thus, while the versatility and power of constraint solving systems is highly desirable, the stochastic nature of constrained optimization compute times results in a lack of bounded algorithm performance. Such stochastic compute time algorithms are usually not considered for real-time applications such as control. Thus, there is a need for an approach in real-time applications such as control that uses stochastic compute time algorithms with constrained optimization solvers.

There have been various approaches in problem solving techniques, such as U.S. Pat. No. 5,870,731 to Trif et al. titled "Adaptive Problem Solving Method and System," which teaches a problem solving method including retrieving a question from a storage device, outputting the question to an output device, receiving an answer from the user, assigning a fuzzy logic coefficient to the answer, and accessing a learning route authority from the storage device to determine the identity of a subsequent question. Answers to questions are learned through user-provided evaluations in a system that is not designed for autonomous, real-time use.

U.S. Pat. No. 6,088,690 to Gounares et al. titled "Method and Apparatus for Adaptively Solving Sequential Problems in a Target System Utilizing Evolutionary Computation Techniques" discloses a system in which chromosomes are applied to a target system one action at a time and the change in properties of the target system is measured after each action is applied. A fitness rating is calculated for each chromosome based on the property changes produced in the target system by the chromosome. The fitness rating calculation is defined so that successive generations of chromosomes will converge upon desired characteristics. This approach is not based on problem analysis and again is not for real-time use.

Finally, U.S. Pat. No. 6,144,953 to Sorrells et al. titled "Time-Constrained Inference Strategy for Real-Time Expert Systems" teaches a control process and an inference network which assign merit values to each inference node of the inference network. The merit values reflect the processing cost of expanding a node to calculate a likelihood value for the proposition that the node represents. The merit values are then used in the control process to determine which of the nodes will be processed first to calculate likelihood values. This establishes a "best-first" control process, which takes account of the processing cost of each node in the inference network to determine which nodes to evaluate first. However, this approach does not provide the capability of learning from, analyzing and adapting to presented problems.

SUMMARY OF THE INVENTION

Briefly stated, and in accordance with one aspect of the present invention, disclosed herein is a method for developing and using real time applications for a dynamic system having a sensing subsystem, actuation subsystem, a control subsystem, and an application subsystem utilizing stochastic compute time algorithms. After optimization functions, desired state and constraints are received and detector data has been provided from a sensor subsystem, a statistical optimization error description is generated. From this statistical optimization error description a strategy is developed, including the optimization errors, within the control subsystem. An execution module within the control subsystem then sends an execution strategy to various actuators within the actuation subsystem.

In accordance with another aspect of the invention, there is disclosed a dynamic system utilizing stochastic compute time algorithms in developing real time applications. The system includes an applications system, a sensing subsystem having a plurality of detectors, which transmit information from the detectors to a control subsystem. The control subsystem includes at least one system state module, at least one state action module, and at least one execution module. Communication means transmits execution instructions from the execution module to a plurality of actuators within an actuation subsystem.

In yet another aspect of the invention, there is provided an article of manufacture in the form of a computer usable medium having computer readable program code embodied in the medium which, when the program code is executed by the computer, causes the computer to perform method steps for developing and using real time applications using stochastic compute time algorithms on a dynamic system. The method includes receiving initial detector data, optimization functions, desired system state, and constraints and generating a statistical description, developing a strategy, and executing the strategy in a real time application.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Disclosed herein are a system and method for developing and using dynamic system control through stochastic compute time algorithms, specifically constraint solving approaches, through the use of statistical descriptions of the algorithm performance developed off-line and/or on-line during execution. The algorithm is run using a variety of inputs and the probability distribution of the outputs is determined for a fixed computation time. Various methods such as complexity analysis, phase-transition descriptions, or other problem classifications may be used to parameterize the resulting probability distributions characterizing algorithm performance. Methods of stochastic control are generalized to include statistical performance of algorithms, thus enlarging the domain of algorithms that can be used to control complex systems to include realistic complex models. In the following disclosure the system and method are described with reference to control applications, however, one skilled in the art would appreciate that the method and system disclosed herein would also be applicable as a service in other real-time applications.

The prior art has included a number of efforts to account for plant uncertainty and design robust controllers, to represent model uncertainty, and to model deterministic uncertainty. In these various approaches, uncertainty in the plant, the measurements, and outside disturbances are modeled and robust control methods are used to account for these uncertainties. In all these cases, it is assumed that for a given set of state observations Y, an estimate of the system state $X^*=f(Y)$ could be made and from the estimated state $X^*$ a control action $U=g(Y,X^*)$ is computed, where f(.) and g(.,.) are bounded algorithms, that is, for a given input, the output could be computed within the loop time of the system. If, however, $X^*$ and U are computed using constrained optimization, the computation of $X^*$ and U is no longer fixed and can vary quite significantly as Y changes. For some values of Y, the computation of $X^*$ and/or Y can take much longer than others. Or equivalently, if the problem is formulated as a constrained optimization problem, the quality of the solution can be much worse. This stochastic behavior of computation has not been explicitly included or considered in prior art.

Figure 1:
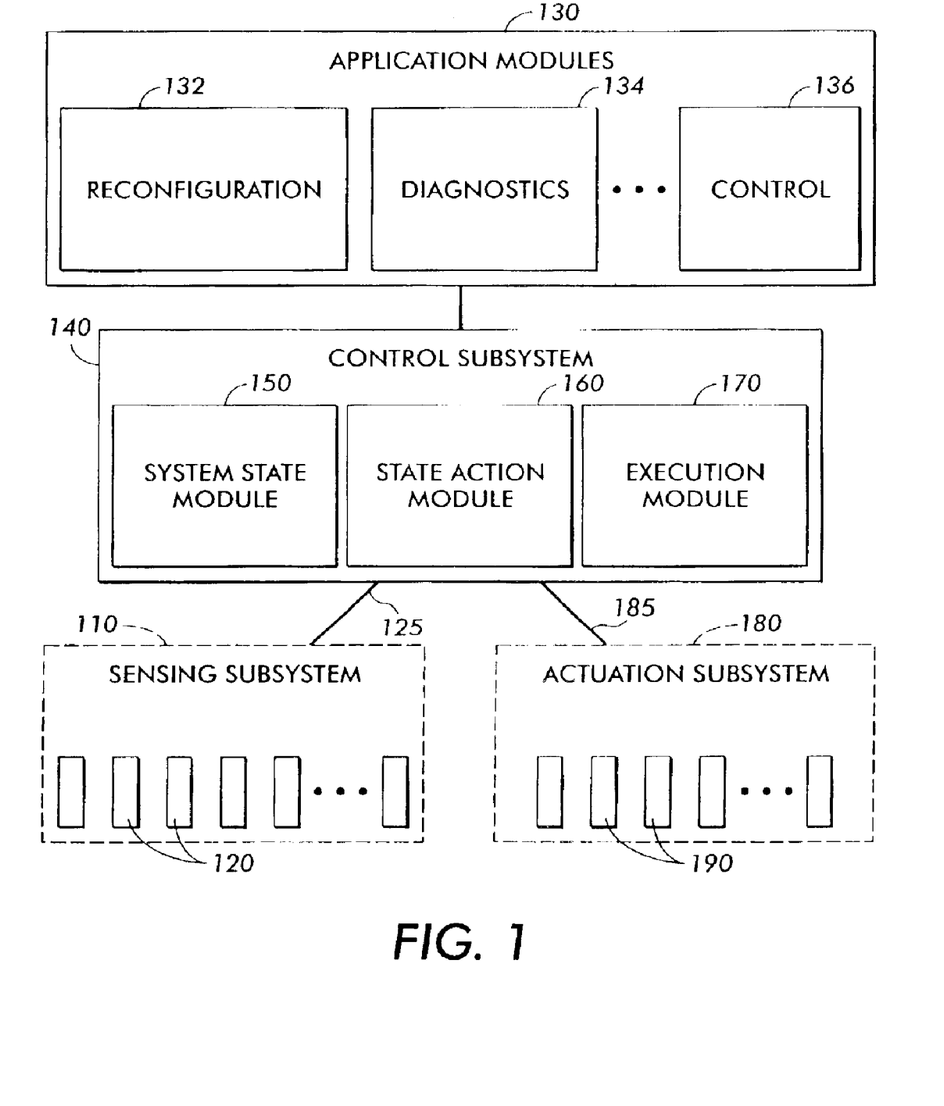
FIG. 1 is a block diagram illustrating the components of a system for implementing real-time applications on stochastic compute time algorithms.

A system which implements real-time applications based on stochastic compute time algorithms is illustrated in FIG. 1. Here an example system 130 includes application modules such as reconfiguration module 132, diagnostics module 134, and control module 136, or planning and scheduling modules (not shown) as well as others. Control subsystem 140 includes system state module 150 that estimates the dynamic system's state, state action module 160 that generate a control signal based on the system state and desired state and execution module 170 that generates the action needed to bring the system state closer to the desired state. Sensing subsystem 110 includes a variety of detectors 120, which may sense a variety of quantities, such as temperature, velocity, pitch, yaw, time, etc. The output from detectors 120 is provided to control subsystem 140 via network connection 125. System state module 150 generates and updates a statistical description of the state of the system based on information received from detectors 120, taking into consideration accompanying detector noise. The resulting computed system state includes an element of algorithm noise developed by the computations. The solver then determines the probability distributions of errors, which is utilized by state action module 160 to generate a performance strategy. The performance strategy is then passed to execution module 170, which transmits execution instructions via network connection 185 to actuation subsystem 180, which includes various actuation modules 190.

Figure 2:
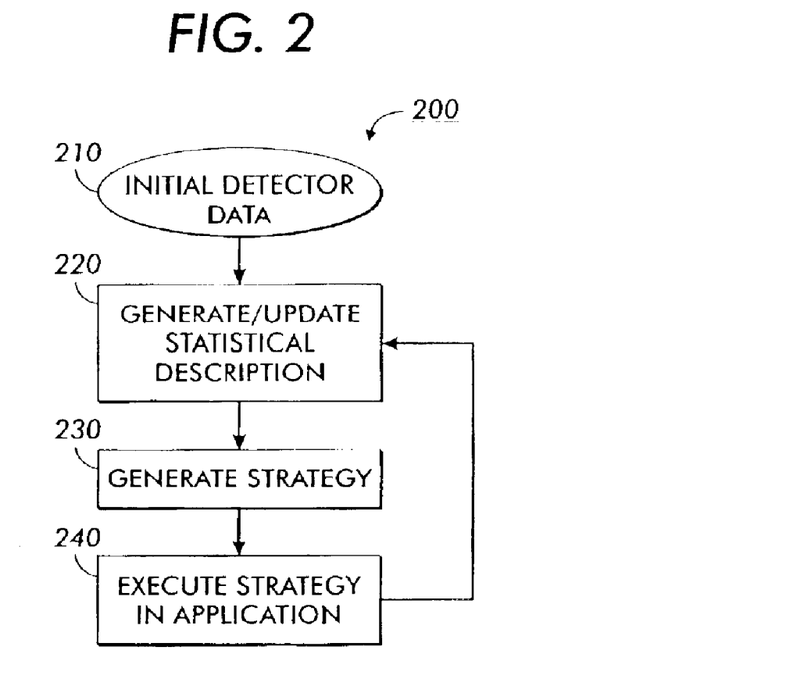
FIG. 2 is a flow chart illustrating the operation of the system according to FIG. 1.

Referring now to FIG. 2, a flow chart illustrates the method for using stochastic compute time algorithms for various real-time applications such as control, diagnosis, or reconfiguration. It is noted that although the method and system disclosed herein are described in terms of control systems for convenience and simplification, the method and system are also applicable to a plurality of applications, all of which are contemplated by the disclosure and scope of the claims herein. In method 200, initial detector data is received and accumulated at 210. A statistical description or model 220 of the algorithm is generated, either off-line or during operation. The statistical description is then used to generate a control strategy 230, which takes into consideration the stochastic computational time of the algorithm to generate acceptable control. For on-line computation, as statistical model 220 is updated, the corresponding control strategy 230 will also be changed to reflect the new knowledge concerning the behavior of the algorithm. Control strategy 230 is then executed at 240 and the results are returned to update statistical description 220.

Figure 3:
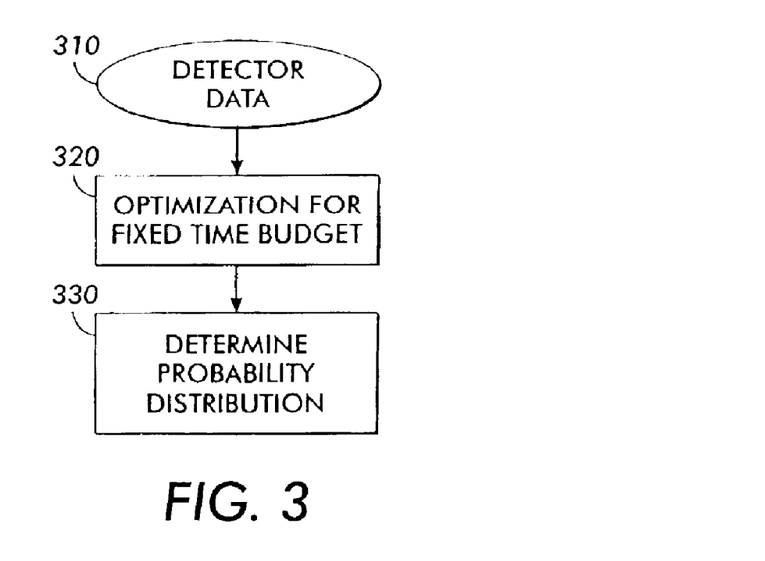
FIG. 3 is a flow chart illustrating an embodiment for generating or updating a statistical description according to the subject invention.
Figure 4:
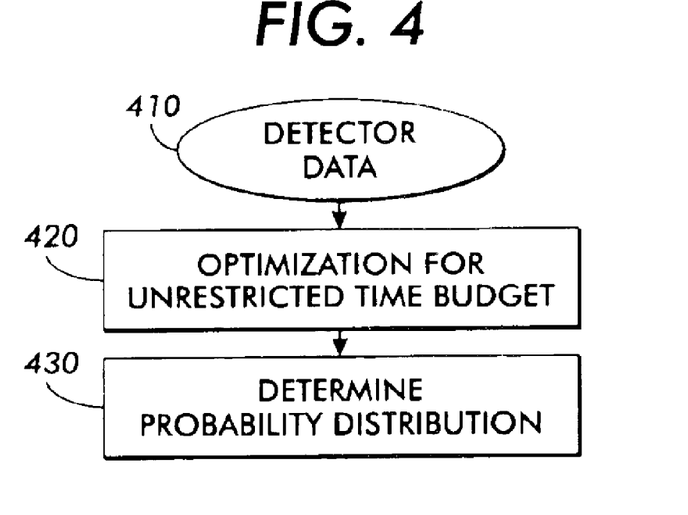
FIG. 4 is a flow chart illustrating an alternate embodiment for generating or updating a statistical description according to the subject invention.
Figure 5:
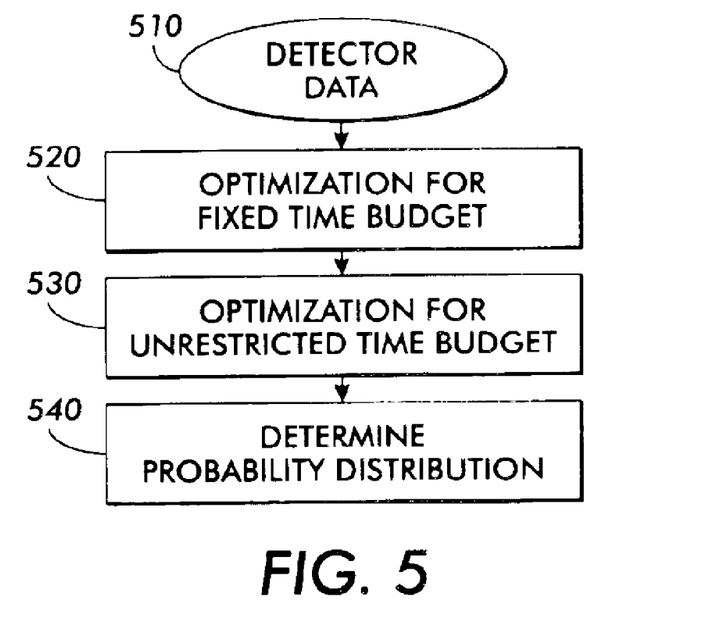
FIG. 5 is a flow chart illustrating another alternate embodiment for generating or updating a statistical description according to the subject invention.

FIGS. 3 through 5 provide various embodiments for generating or updating the statistical description. In FIG. 3, detector data 310 is optimized over a fixed time budget 320 to determine a probability distribution of errors 330. Detector data 310 includes both the set of observations Y' and detector noise component $\Delta Y$, such that $$Y=Y'+\Delta Y.$$

To determine an estimated system state $X^*$ from a set of detector data Y, which may include time, temperature, speed, pitch, yaw, or any other sensed quantity, the optimization problem may be written such that $X^*$ satisfies $$\min_x h_1(X)$$

subject to $(X-f(Y))=0$.

Because knowing only Y may not uniquely define the state, X of the system, it is necessary to use an optimization function h, which attaches a value to each solution. Least squares and minimum maximum error are two examples of commonly used optimization functions for valuing various solutions satisfying the constraints This calculation can be repeated at each time step using new and previous observations to obtain the best estimate of the current state of the system. To generate a strategy for control, the state of the system determined by generating and updating of the system description includes both the estimated state of the system and a noise component resulting from the calculations, such that $X^*$ may be represented by $$X^*=X+\Delta X,$$

where $\Delta X$ represents the algorithm noise component. Thus algorithmic noise is treated like real noise in determining a possible control action. To determine a control action, a control law defined as U is the minimum solution to $$\min_U h_2(U, X^*, X_d)$$

subject to $(U-g(Y, X^*, X_d))=0$, where $h_2(U, X^*)$ is an objective function which captures the most desirable performance and $X_d$ is the desired state of the system. If either $h_1(X)$ or $h_2(U, X^*)$ are constant functions, the optimization problem becomes one of satisfiability rather than optimization, because all solutions that satisfy the constraints are equally weighted by the objective functions. Alternatively, the constraints may be included as part of the objective function using penalty functions or most commonly, Lagrange multipliers. X, Y, and U may be continuous, discrete, or defined on hybrid continuous-discrete spaces.

The optimization problems may be solved by numerous methods available in the art. For example, if the problems are defined over continuous variables, solution methods include Newton's methods, quasi-Newton methods, interior point, simplex, Nelder-Mead, etc. Optimization methods for discrete problems include depth or breadth-first search, branch-and-bound search, and outer approximations. The constraints are included by Lagrange multipliers or penalty functions.

For the purposes herein, the solutions to the optimization problems are found for a set of Y values which may be randomly chosen, selected to represent likely states encountered during operation, worst-case conditions, or states acquired during operation. The optimization problems are solved for a fixed computation or time budget and yield a distribution of objective function values and Lagrangian values for the best solution at the end of the computation. In addition, one may solve the constrained optimization problems for the set of Y values and determine the distribution of solution times. Thus, prior to and/or during operation, a distribution of objective function values and solution times can be obtained for a set of inputs. If the solver does not reach the solution within the allotted time budget, the best returned solutions X' and U' will differ from the desired solutions X*, U* by errors ΔX and ΔU given by $$X'=X^*+\Delta X$$

$$U'=U^*+\Delta U$$

In FIG. 4, detector data 410 is optimized over an unrestricted time budget 420 to determine a probability distribution of errors 430. The approach described hereinabove with reference to FIG. 3 is also utilized in this embodiment, except that an unrestricted time budget is utilized for the estimation. In FIG. 5, detector data 510 is optimized over a fixed time budget 520 and also over an unrestricted time budget 530 to determine a probability distribution of errors 540, again using the approach described with reference to FIG. 3, except that both a restricted time budget and unrestricted time budget are utilized for the estimation.

Figure 6:
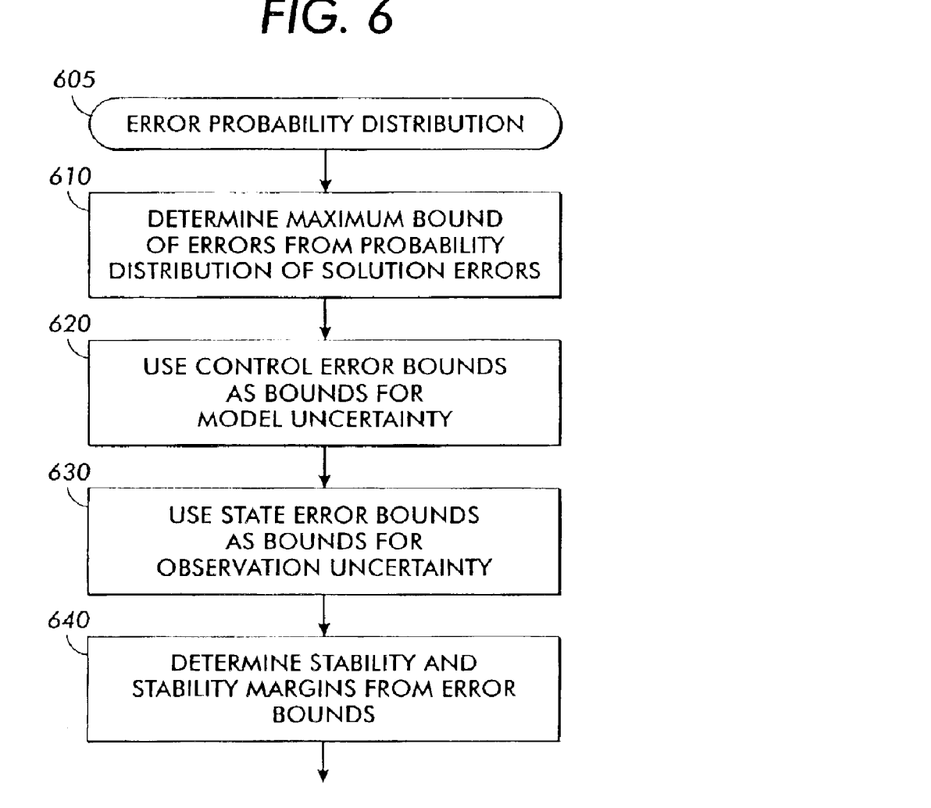
FIG. 6 is a flow chart illustrating an embodiment for generating a strategy for control according to the subject invention.

The probability distributions of errors ΔX and ΔU can be used to generate control actions in a dynamic system in various ways. One of these is shown in the embodiment illustrated in FIG. 6, where a maximum bound of errors 610 is developed from the probability distribution of solution errors 605. If there is a maximum bound 610 to the error |ΔX| and |ΔU| given by $\Delta X_{max}$ and $\Delta U_{max}$, these bounds can be used as bounds for model uncertainty 620. $\Delta U_{max}$ is equivalent to a model uncertainty 620 and $\Delta X_{max}$ is equivalent to observation uncertainty 630. From these error bounds, stability and stability margins 640 can be determined and a control strategy formulated. Although stability and stability margins are discussed for the purposes of simplicity, it is noted that other measures of control may be determined. This strategy is then passed to the system for execution.

Figure 7:
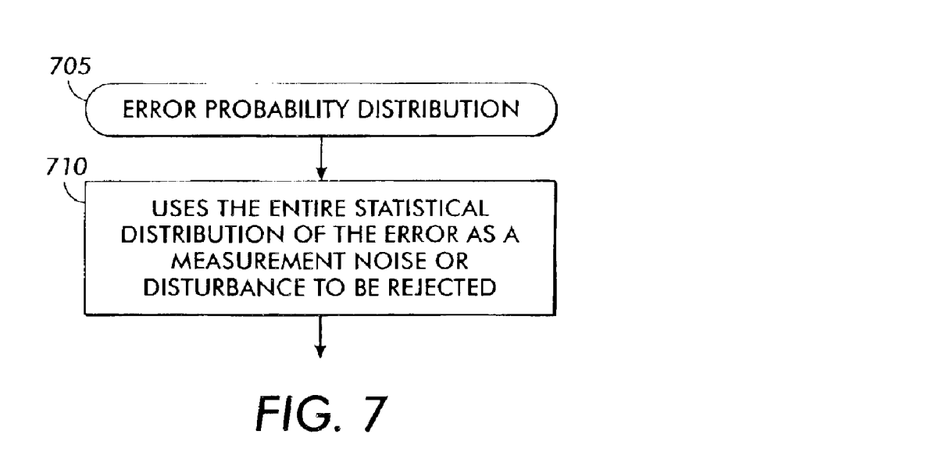
FIG. 7 is a flow chart illustrating an alternate embodiment for generating a strategy for control according to the subject invention.

Referring now to FIG. 7, an alternate embodiment receives error probability distribution 705 and uses the entire statistical distribution of the error as a measurement noise or disturbance to be rejected at 710. The error distribution can be fit to a parametric family such as a normal, exponential, or Cauchy distribution or moments of the distribution can be obtained. The fitted distributions or moments can then be used to ensure that the expected performance meets the desired goals. Possible solutions include the stochastic Riccati equation for linear quadratics regulator (LQR) optimization and normally distributed noise. Singular value decomposition and mu synthesis are other ways of utilizing statistical characterization of the noise to generate control. The problem that may occur is that the error distribution can have such long tails that the noise signal associated with the algorithm noise may not be square-integratable, indicating that a frequency response or Laplace transform needed for this procedure can not be found. This embodiment treats such noise as a disturbance to be rejected. The resulting control strategy is then passed to the system for execution.

Figure 8:
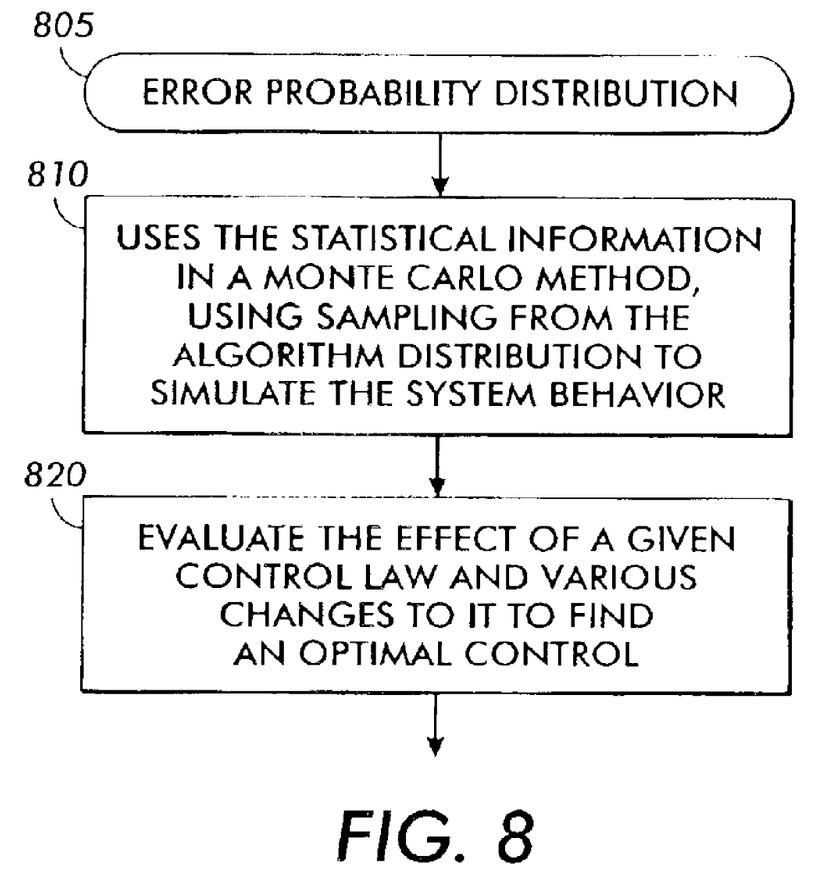
FIG. 8 is a flowchart illustrating another alternate embodiment for generating a strategy for control according to the subject invention.

Turning to FIG. 8, another embodiment receives error probability distribution 805 and utilizes Monte Carlo methods 810 to simulate the system behavior. The system can be simulated and sampling from the algorithm distribution can be used to simulate the system behavior. The probability that the system will behave in an acceptable fashion can be determined. The optimal control at 820 can be adjusted in order that the probability of undesirable behavior is below a specific value. This optimal control strategy is then passed to the system for execution.

While the present invention has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed:

1. A method for developing and using real time applications using stochastic compute time algorithms in the form of constrained optimization techniques under feedback control to control a closed-loop, complex dynamic system including a sensing subsystem, actuation subsystem, control subsystem, and application subsystem, comprising:

receiving initial detector data, optimization functions, desired state and constraints;

inferring an actual system state from said initial detector data, wherein said actual system state is expressed in constraints;

inferring a desired system state from said desired state and constraints;

generating a statistical description of the dynamic system, utilizing the difference between said actual system state inferred from said initial detector data and said desired system state, wherein at least one received optimization function is applied to optimize said initial detector data over a time budget to determine a probability distribution of errors;

developing a desired control strategy based on said statistical description, comprising utilizing constraint optimization techniques;

determining at least one control signal to issue for said desired control strategy;

executing said control signals in a real time application;

receiving a next set of detector data, wherein said next set of detector data is expressed in system constraints; and providing feedback control comprising updating said statistical description with said next set of detector data.

2. The method for developing and using real time applications using stochastic compute time algorithms according to claim 1, wherein said statistical description is generated off-line.

3. The method for developing and using real time applications using stochastic compute time algorithms according to claim 1, wherein said statistical description is generated during operation of the dynamic system.

4. The method for developing and using real time applications using stochastic compute time algorithms according to claim 1, wherein said time budget comprises a fixed time budget.

5. The method for developing and using real time applications using stochastic compute time algorithms according to claim 1, wherein said time budget comprises an unrestricted time budget.

6. The method for developing and using real time applications using stochastic compute time algorithms according to claim 1, wherein applying said optimization function over a time budget comprises:

optimizing said detector data over a fixed time budget; and optimizing said detector data over an unrestricted time budget.

7. The method for developing and using real time applications using stochastic compute time algorithms according to claim 6, wherein developing a desired control strategy comprises using the entire statistical distribution of the error as a measurement noise or disturbance to be rejected.

8. The method for developing and using real time applications using stochastic compute time algorithms according to claim 6, wherein developing a desired control strategy comprises using the statistical information in a Monte Carlo method, using sampling from the algorithm distribution to simulate the system behavior and evaluating the effect of a given control law and various changes to it to find an optimal control.

9. The method for developing and using real time applications using stochastic compute time algorithms according to claim 1, wherein developing a desired control strategy comprises:

determining a maximum bound of errors from a probability distribution of solution errors;

using control error bounds as bounds for model uncertainty;

using state error bounds as bounds for observation uncertainty; and determining stability and stability margins from error bounds.

10. The method for developing and using real time applications using stochastic compute time algorithms according to claim 1, wherein the application subsystem includes a diagnostic subsystem.

11. The method for developing and using real time applications using stochastic compute time algorithms according to claim 1, wherein the application subsystem includes a reconfiguration subsystem.

12. The method for developing and using real time applications using stochastic compute time algorithms according to claim 1, wherein the application subsystem includes a control subsystem.

13. An article of manufacture comprising a computer usable medium having computer readable program code embodied in said medium which, when said program code is executed by said computer causes said computer to perform method steps for developing and using real time applications using stochastic compute time algorithms in the form of constrained optimization techniques under feedback control to control a closed-loop, complex dynamic system, said method comprising:

receiving initial detector data, optimization functions, desired state and constraints;

inferring an actual system state from said initial detector data, wherein said actual system state is expressed in constraints;

inferring a desired system state from said desired state and constraints;

generating a statistical description of the dynamic system, utilizing the difference between said actual system state inferred from said initial detector data and said desired system state, wherein at least one received optimization function is applied to optimize said initial detector data over a time budget to determine a probability distribution of errors;

developing a desired control strategy based on said statistical description, comprising utilizing constraint optimization techniques;

determining at least one control signal to issue for said desired control strategy;

executing said control signals in a real time application;

receiving a next set of detector data, wherein said next set of detector data is expressed in system constraints; and providing feedback control comprising updating said statistical description with said next set of detector data.

* * * * *